Figure 7:
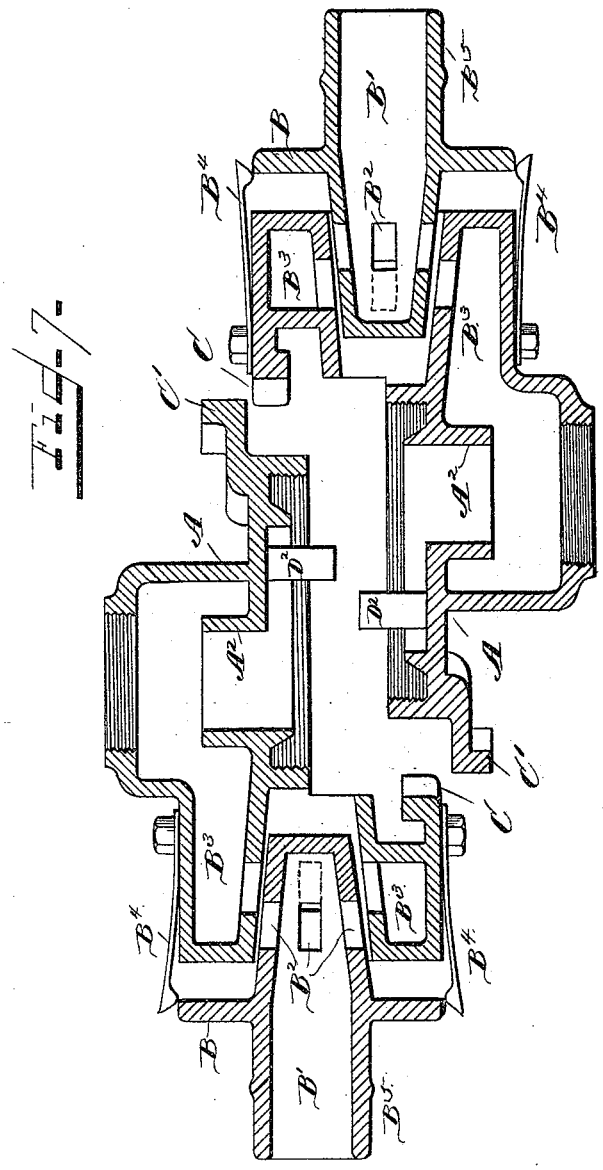

(No Model.) 5 Sheets—Sheet 1.
G. MASSEY.
RAILWAY BRAKE PIPE COUPLING.
No. 438,290. Patented Oct. 14, 1890.
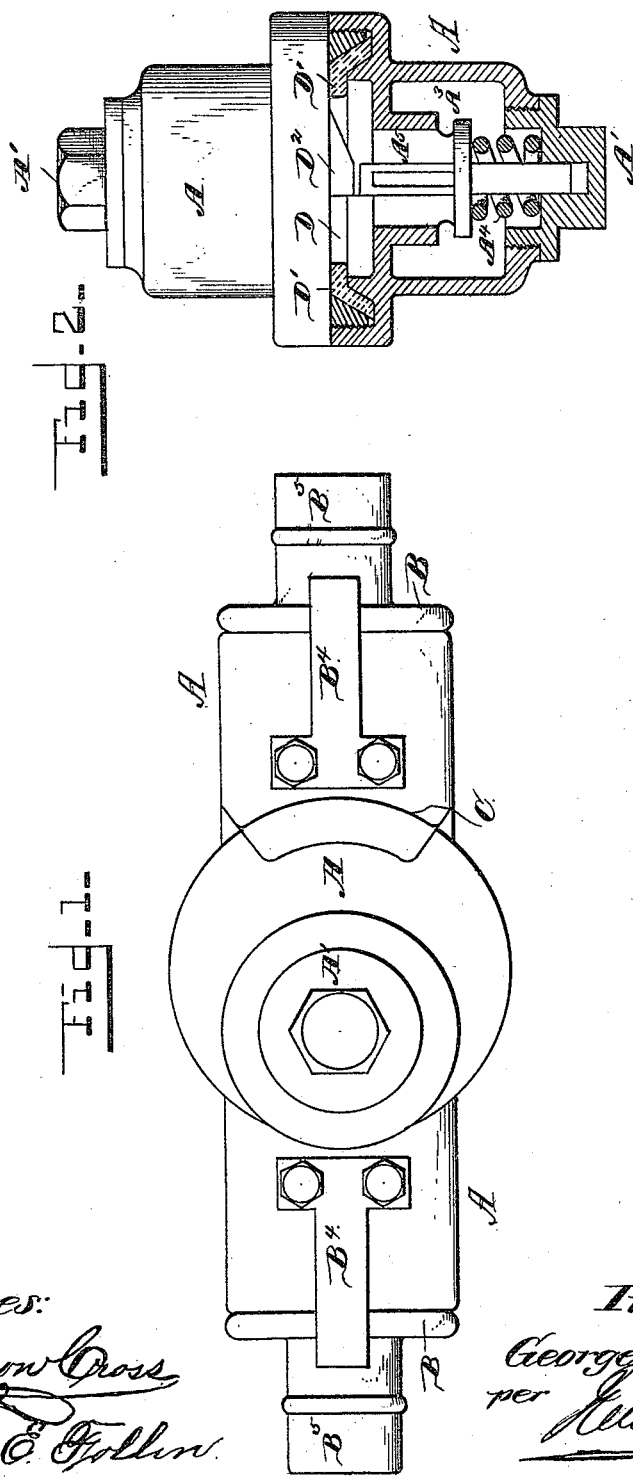

(No Model.) 5 Sheets—Sheet 2.
G. MASSEY.
RAILWAY BRAKE PIPE COUPLING.
No. 438,290. Patented Oct. 14, 1890.
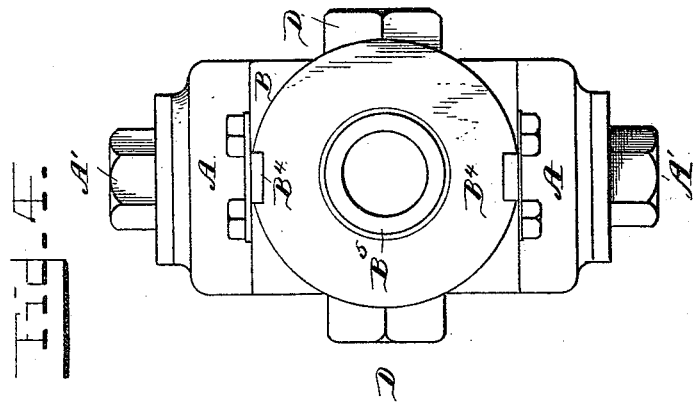
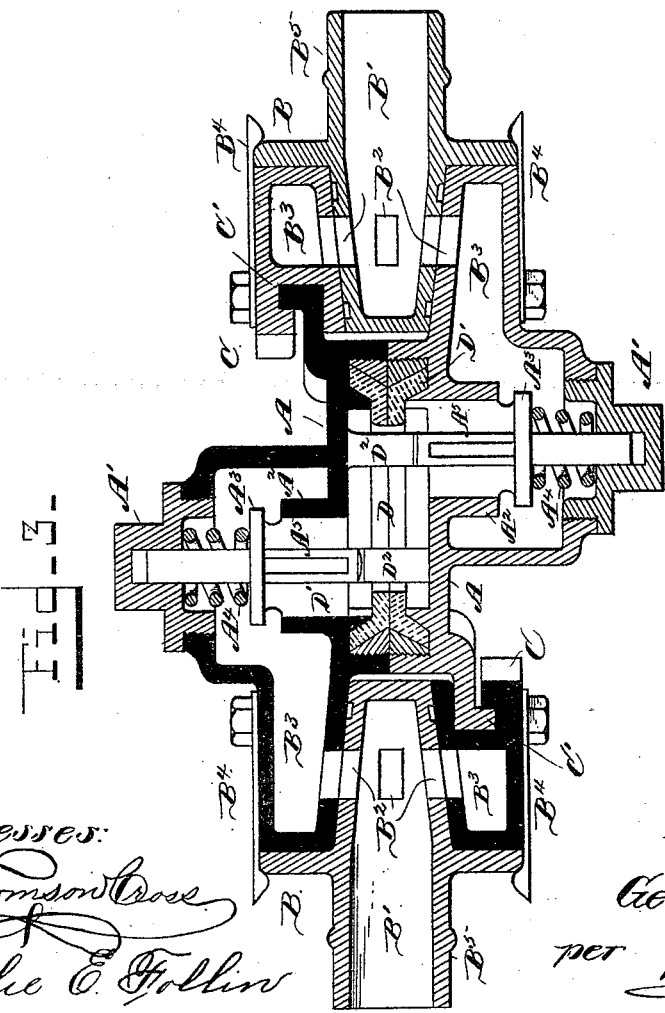
Witnesses:
J. Thomson Cross
Leslie E. Follin
Inventor:
George Massey
per [signature]
Att'y.

(No Model.)  5 Sheets—Sheet 3.
G. MASSEY.
RAILWAY BRAKE PIPE COUPLING.
No. 438,290.  Patented Oct. 14, 1890.
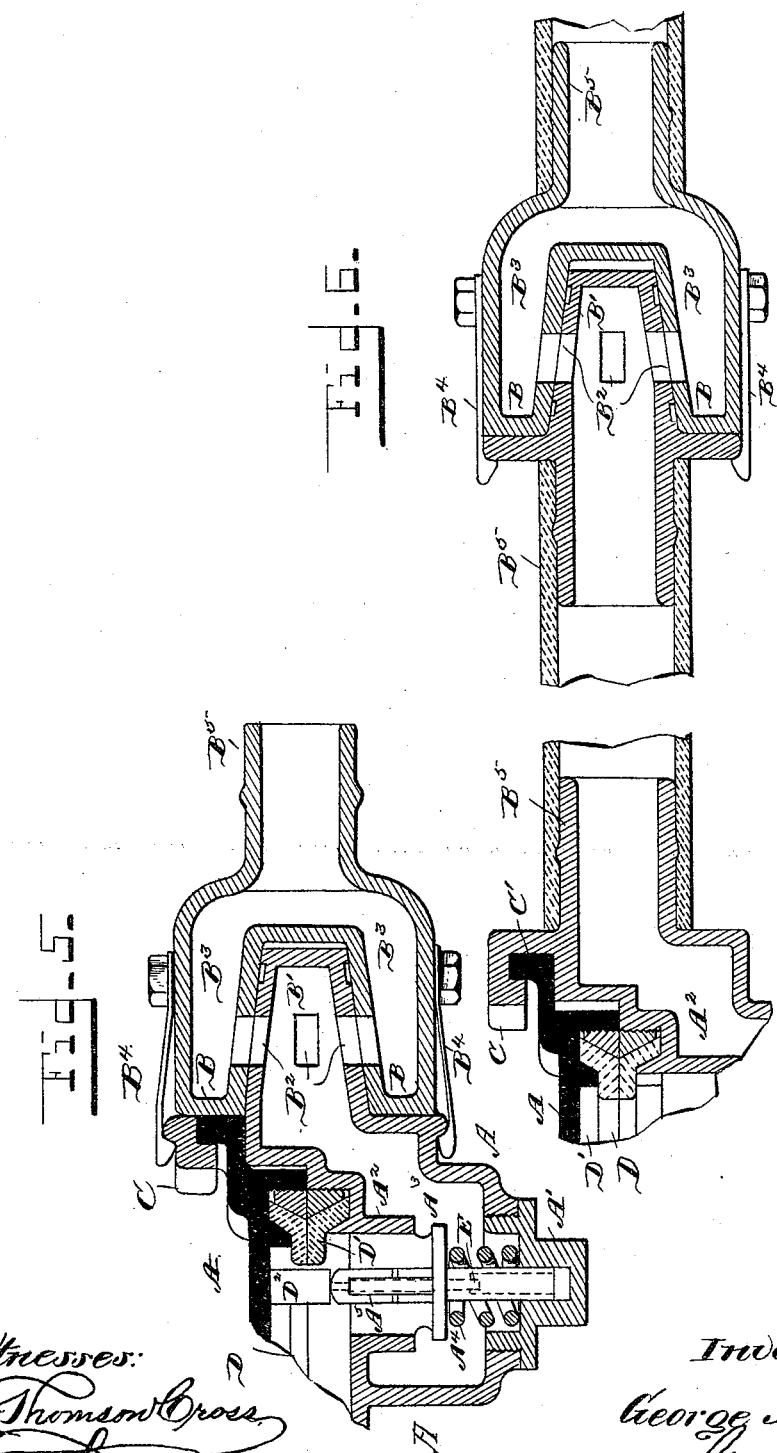
Witnesses:
J. Thomson Cross
Leslie E. Gollin
Inventor:
George Massey.
per Henry Orth
Atty.

(No Model.) 5 Sheets—Sheet 4.

G. MASSEY.
RAILWAY BRAKE PIPE COUPLING.

No. 438,290. Patented Oct. 14, 1890.

Witnesses:
J. Thomson Cross
Leslie E. Jollen

Inventor:
George Massey.
per Henry Orth
Atty.

(No Model.) 5 Sheets—Sheet 5.
G. MASSEY.
RAILWAY BRAKE PIPE COUPLING.
No. 438,290. Patented Oct. 14, 1890.
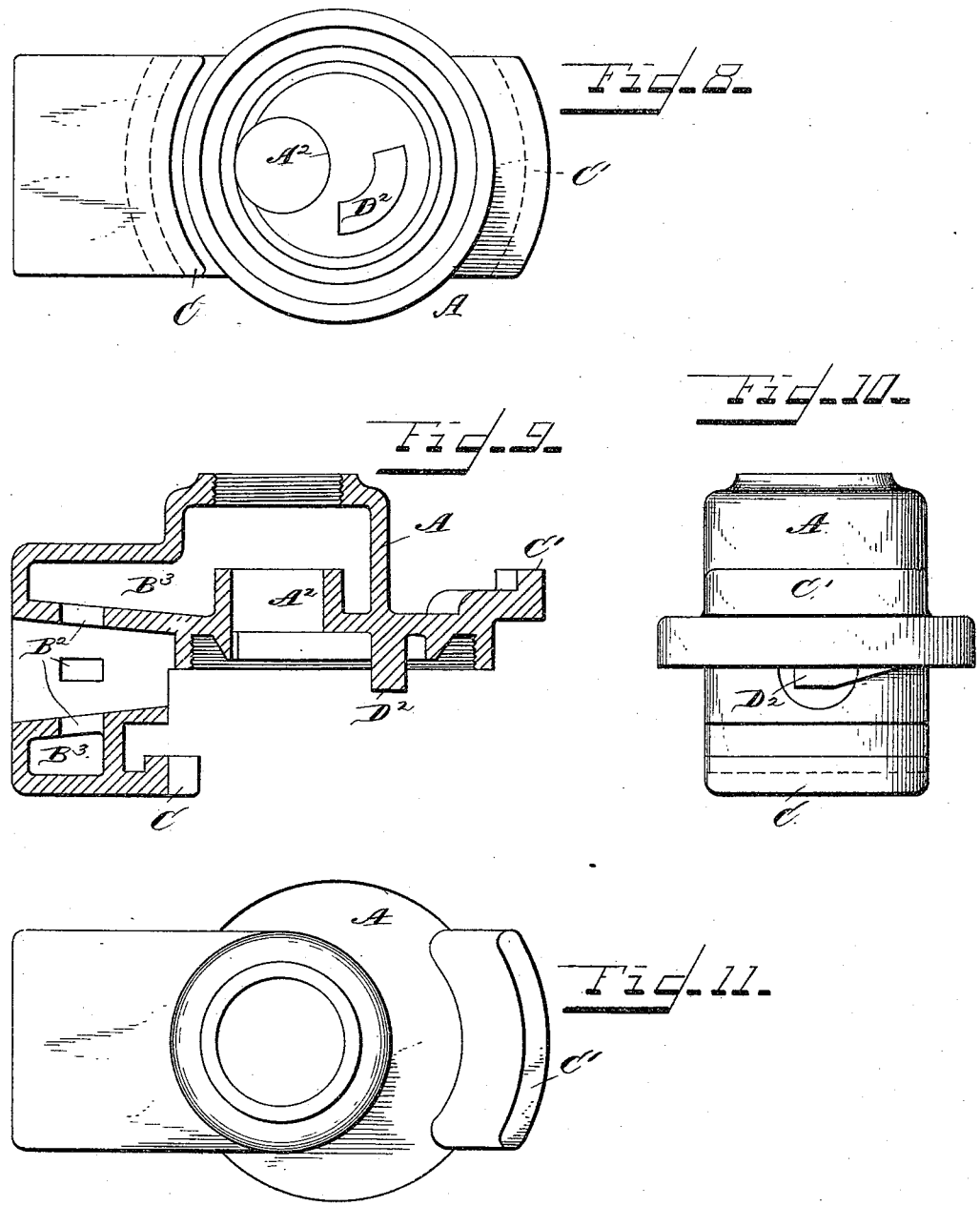

UNITED STATES PATENT OFFICE.

GEORGE MASSEY, OF SYDNEY, NEW SOUTH WALES.

RAILWAY-BRAKE-PIPE COUPLING.

SPECIFICATION forming part of Letters Patent No. 438,290, dated October 14, 1890.

Application filed November 3, 1888. Serial No. 289,937. (No model.) Patented in New South Wales December 15, 1887, No. 393, and in Victoria December 21, 1887, No. 5,526.

*To all whom it may concern:*

Be it known that I, GEORGE MASSEY, civil and mechanical engineer, a subject of the Queen of Great Britain, residing at Sydney, in the British Colony of New South Wales, have invented new and useful Improvements in Railway-Brake-Pipe Couplings, (for which I have obtained patents in the British Colonies of New South Wales, No. 393, bearing date the 15th day of December, 1887, and Victoria, No. 5,526, bearing date the 21st day of December, 1887,) of which the following is a specification.

This invention has been devised in order to provide a coupling for joining the brake-pipe of different vehicles in a train, which will be more easily manipulated, more reliable in operation, and last longer than couplings hitherto used.

Railway-brake-pipe couplings according to these improvements are constructed in two halves or counterparts, each having a valve elastically retained upon its seat and each valve having an outward stem. These counterparts are provided with, as an essential part of this invention, a stud, wedge-piece, or spiral adapted to take over or on the stem of the valve, and they are also provided with faced or joining surfaces and packing and with locking-pieces. These parts are all so arranged that the counterparts may be placed face to face and given a partial revolution into the locked position, this partial revolution causing the studs or spirals to force and keep the valves from off their seats, and thus provide a through connection between the pipes. Provision is also made for the parting of the coupling or of the pipe without closing either valve in the event of the train breaking apart; but in order that my invention may be clearly understood reference will now be made to the drawings herewith, in which—

Figure 1 is a plan of a coupling complete. Fig. 2 is an end view partly in section; Fig. 3, a longitudinal sectional elevation, and Fig. 4 an end elevation; and Figs. 5 and 6 are like views showing a slight modification in the construction of the coupling. Fig. 7 shows by a longitudinal section of the parts of the coupling and their pipe attachments detached. Fig. 8 is an under side view, Fig. 9 a vertical longitudinal section, Fig. 10 an end elevation, and Fig. 11 a top plan view, of one of the parts of the coupling.

A are counterparts or half-couplings. (More clearly shown in Figs. 3 and 7 to 11.)

A' are caps; $A^2$, valve-seats; $A^3$, valves having springs $A^4$ and stems $A^5$.

B are sockets; B', nozzles; $B^2$, ports; $B^3$, passages to valves.

$B^4$ are elastic fastenings or catches.

$B^5$ is coupling for slack-pipe.

C are lips or catches; C', flange or rib.

D is joining-face, D' packing, and $D^2$ is stud, wedge-piece, or spiral taking above stem $A^5$.

In operation faces D are placed together, the packing D' making a joint, and the counterparts A are then given a twist, so that flanges or ribs C' take under lips or catches C and retain the coupling in its normal active position. The same motion causes the wedge-piece $D^2$ to press stems $A^5$ and lift and keep valves $A^3$ off seats $A^2$, and the coupling is made, the fluid passing from one nozzle B' through ports $B^2$, passage $B^3$, valves $A^2$ $A^3$, and through the other valve passage and port to the other nozzle B'. When a severe strain is put upon the pipe, as when a train breaks, the springs or catches $B^4$ allow a nozzle B' or both nozzles to be drawn out of socket B, and this is done without derangement of the mechanism of the coupling. The coupling is undone by untwisting the counterparts A, when ribs C' leave lips or catches C, and the wedge-pieces $D^2$ allow springs $A^4$ to close valves $A^3$ upon seats $A^2$.

In Figs. 5 and 6 I have shown in longitudinal sections modified constructions of improved couplings, in which the mechanism and operation are the same as that before described, except that in Fig. 5 the socket B and nozzle B' are reversed—that is to say, the counterpart or half-coupling A carries the nozzle instead of the socket, and the socket is upon the coupling-pipe $B^5$. In this also I have shown an extra relieving-valve E, which is opened, by which the contact of wedge-piece $D^2$ against its stem allows the compressed fluid to pass from the passage side of valve $A^3$ into the interior of coupling and make the operation of coupling comparatively easy. In Fig. 6 the socket or nozzle is not upon or near the counterpart or half-coupling A at all, but both are fitted up in another port of the through-pipe.

I would have it understood that I do not confine myself to the precise details which I have illustrated as being used in carrying out my invention so long as the nature of the same be retained; neither do I confine myself to any particular size or materials of which any parts may be constructed; but, Having thus particularly described and ascertained the nature of this invention and in what manner the same is to be performed, I claim as improvements in railway-brake-pipe couplings—

1. A brake-pipe coupling constructed of two sections, each provided with a locking-rib arranged to interlock when the sections are united and turned one upon the other, a valve for each of said sections normally held to its seat, and a valve-actuating device connected with the sections of the couplings and adapted to move said valves off their seats and hold them in that position when the sections of the coupling are connected, as set forth, in combination with a pipe attachment for each of the sections, and an elastic or resilient locking device for locking the pipe attachment to said sections, substantially as and for the purpose specified.

2. A brake-pipe coupling constructed of two sections, each provided with a segmental locking-rib adapted to interlock when the sections are united and turned one upon the other, a spring-actuated valve for each of said sections, held normally to its seat, a wedge-shaped valve-actuating rib on each of said sections, adapted to gradually move the valves off their seats as the sections of the coupling are turned one upon the other in connecting the same, a pipe attachment for each of said sections, and a spring-catch for connecting the pipe attachments to their respective coupling-sections, substantially as and for the purpose specified.

GEO. MASSEY.

Witnesses:
THOS. J. WARD,
*Clerk to Edward Waters, Patent Office, Sydney.*
WILLIAM A. WILLIAMS,
*Draughtsman, Ed. Waters's Patent Office, Sydney.*